United States Patent
Raju et al.

(10) Patent No.: US 10,805,625 B2
(45) Date of Patent: *Oct. 13, 2020

(54) METHOD, SYSTEM AND COMPUTER PROGRAM PRODUCT FOR ADJUSTING A STEREOSCOPIC IMAGE IN RESPONSE TO DECODED DISPARITIES BETWEEN VIEWS OF THE STEREOSCOPIC IMAGE

(75) Inventors: Veeramanikandan Raju, Bangalore (IN); Wei Hong, Sunnyvale, CA (US); Minhua Zhou, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1028 days.

This patent is subject to a terminal disclaimer.

(21) Appl. No.: 13/532,105

(22) Filed: Jun. 25, 2012

(65) Prior Publication Data

US 2013/0010069 A1    Jan. 10, 2013

Related U.S. Application Data

(60) Provisional application No. 61/504,491, filed on Jul. 5, 2011.

(51) Int. Cl.
  *H04N 19/46*     (2014.01)
  *H04N 19/70*     (2014.01)
  *H04N 19/597*    (2014.01)
  *H04N 13/128*    (2018.01)

(52) U.S. Cl.
  CPC .......... *H04N 19/46* (2014.11); *H04N 13/128* (2018.05); *H04N 19/597* (2014.11); *H04N 19/70* (2014.11)

(58) Field of Classification Search
  CPC ......... G06T 7/0022; G06T 2207/20016; G06T 2207/10021; G06T 2207/10012; H04N 13/0271; G06K 9/00
  USPC ........ 348/42, 46; 382/103, 154; 375/240.26; 359/619
  See application file for complete search history.

(56) References Cited

U.S. PATENT DOCUMENTS

| | | | | |
|---|---|---|---|---|
| 6,081,577 | A * | 6/2000 | Webber ................ | G01N 23/046 378/23 |
| 2003/0107815 | A1 * | 6/2003 | Redmond ..................... | 359/619 |
| 2004/0070667 | A1 * | 4/2004 | Ando ................... | H04N 13/167 348/46 |
| 2004/0239685 | A1 * | 12/2004 | Kiyokawa ............ | H04N 13/111 345/619 |
| 2005/0163390 | A1 * | 7/2005 | Chiang .............. | G02B 21/0072 382/254 |
| 2005/0276448 | A1 * | 12/2005 | Pryor ........................... | 382/103 |
| 2006/0203085 | A1 * | 9/2006 | Tomita ................ | H04N 13/122 348/51 |

(Continued)

*Primary Examiner* — Jayanti K Patel
*Assistant Examiner* — Stefan Gadomski
(74) *Attorney, Agent, or Firm* — Ebby Abraham; Charles A. Brill; Frank D. Cimino

(57) ABSTRACT

From a bit stream, at least the following are decoded: a stereoscopic image of first and second views; a maximum positive disparity between the first and second views; and a minimum negative disparity between the first and second views. In response to the maximum positive disparity violating a limit on positive disparity, a convergence plane of the stereoscopic image is adjusted to comply with the limit on positive disparity. In response to the minimum negative disparity violating a limit on negative disparity, the convergence plane is adjusted to comply with the limit on negative disparity.

27 Claims, 7 Drawing Sheets

(56) References Cited

U.S. PATENT DOCUMENTS

| | | | | |
|---|---|---|---|---|
| 2007/0248260 A1* | 10/2007 | Pockett | H04N 13/327 | 382/154 |
| 2008/0218432 A1* | 9/2008 | Ota | G06F 3/1431 | 345/1.3 |
| 2008/0290987 A1* | 11/2008 | Li | G06Q 30/02 | 340/5.1 |
| 2009/0096863 A1* | 4/2009 | Kim | G06K 9/00604 | 348/42 |
| 2009/0160931 A1* | 6/2009 | Pockett | H04N 13/246 | 348/42 |
| 2009/0244066 A1* | 10/2009 | Sugita | G06T 15/20 | 345/427 |
| 2010/0021145 A1* | 1/2010 | Oashi | G09G 3/003 | 386/248 |
| 2010/0111417 A1* | 5/2010 | Ward | G06T 7/579 | 382/173 |
| 2010/0290483 A1* | 11/2010 | Park | H04N 21/235 | 370/472 |
| 2011/0023066 A1* | 1/2011 | Jang | H04N 21/235 | 725/54 |
| 2011/0032330 A1* | 2/2011 | Kim | G09G 3/003 | 348/43 |
| 2011/0063421 A1* | 3/2011 | Kubota | H04N 13/341 | 348/52 |
| 2011/0080466 A1* | 4/2011 | Kask | G06T 5/006 | 348/43 |
| 2011/0109731 A1* | 5/2011 | Koo | H04N 13/128 | 348/51 |
| 2011/0142309 A1* | 6/2011 | Zhang | H04N 17/00 | 382/128 |
| 2011/0292178 A1* | 12/2011 | Goma | H04N 13/0022 | 348/46 |
| 2011/0304618 A1* | 12/2011 | Chen | H04N 13/0022 | 345/420 |
| 2011/0310982 A1* | 12/2011 | Yang | H04N 13/0003 | 375/240.26 |
| 2012/0014590 A1* | 1/2012 | Martinez-Bauza et al. | | 382/154 |
| 2012/0162394 A1* | 6/2012 | Gopishankar | H04N 13/007 | 348/51 |
| 2012/0230580 A1* | 9/2012 | Knee | H04N 13/10 | 382/154 |
| 2013/0141550 A1* | 6/2013 | Pockett | G03B 35/08 | 348/51 |

\* cited by examiner

METHOD, SYSTEM AND COMPUTER PROGRAM PRODUCT FOR ADJUSTING A STEREOSCOPIC IMAGE IN RESPONSE TO DECODED DISPARITIES BETWEEN VIEWS OF THE STEREOSCOPIC IMAGE

CROSS-REFERENCE TO RELATED APPLICATION

This application claims priority to U.S. Provisional Patent Application Ser. No. 61/504,491, filed Jul. 5, 2011, entitled CONVERGENCE PARAMETERS DRIVEN EFFICIENT RENDERING IN STEREOSCOPIC 3D ENCODED STREAMS, naming Veeramanikandan Raju et al. as inventors.

This application is related to co-owned co-pending U.S. patent application Ser. No. 13/532,162, filed on even date herewith, entitled METHOD, SYSTEM AND COMPUTER PROGRAM PRODUCT FOR CODING A STEREOSCOPIC IMAGE, naming Veeramanikandan Raju et al. as inventors.

All of the above-identified applications are hereby fully incorporated herein by reference for all purposes.

BACKGROUND

The disclosures herein relate in general to digital image processing, and in particular to a method, system and computer program product for adjusting a stereoscopic image.

A stereoscopic camera system's convergence distance is a distance from the system's cameras to a convergence plane where viewing axes of the system's cameras intersect. Similarly, a human's convergence distance is a distance from the human's eyes to a convergence plane where the eyes' viewing axes intersect. In one example, the stereoscopic camera system's convergence distance is either: (a) infinity (for a parallel camera configuration); or (b) a fixed distance (for a toe-in camera configuration).

The human's convergence distance is variable. For example, if the human views an image (e.g., within a video sequence of images) on a display screen, then the human's eyes naturally converge to the display screen. Accordingly, the human's natural convergence distance is a distance from the display screen to the eyes.

Nevertheless, if the human views the image with three-dimensional ("3D") effect on a stereoscopic display screen that receives the image from a stereoscopic camera system, then the human's eyes adjust to the image's convergence distance, so that the human may correctly experience the 3D effect. If the image's convergence distance varies from the human's natural convergence distance, then such variation (e.g., from image-to-image or scene-to-scene) can strain the human's viewing of the image with 3D effect, thereby causing the human's eventual discomfort (e.g., headaches and/or eye muscle pain). Such discomfort is a shortcoming, which discourages the human's viewing of the image with 3D effect on the stereoscopic display screen.

SUMMARY

From a bit stream, at least the following are decoded: a stereoscopic image of first and second views; a maximum positive disparity between the first and second views; and a minimum negative disparity between the first and second views. In response to the maximum positive disparity violating a limit on positive disparity, a convergence plane of the stereoscopic image is adjusted to comply with the limit on positive disparity. In response to the minimum negative disparity violating a limit on negative disparity, the convergence plane is adjusted to comply with the limit on negative disparity.

DETAILED DESCRIPTION

Figure 1:
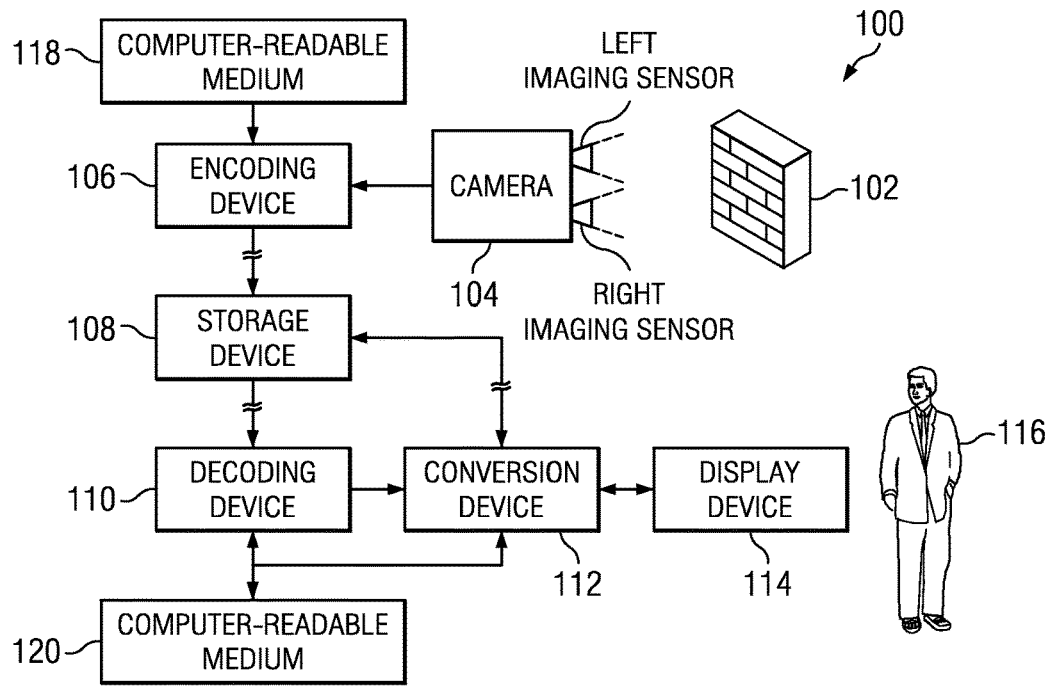
FIG. 1 is a block diagram of an information handling system of the illustrative embodiments.

FIG. 1 is a block diagram of an information handling system (e.g., a portable battery-powered electronics device, such as a mobile smartphone, a tablet computing device, a netbook computer, or a laptop computer), indicated generally at 100, of the illustrative embodiments. In the example of FIG. 1, a scene (e.g., including a physical object 102 and its surrounding foreground and background) is viewed by a stereoscopic camera system 104, which: (a) digitizes images of such views; and (b) outputs a video sequence of such digitized (or "digital") images to an encoding device 106. As shown in FIG. 1, the camera system 104 includes dual imaging sensors, which are horizontally offset from one another, namely: (a) a left imaging sensor for digitizing and outputting (to the encoding device 106) a left image of a view for a human's left eye; and (b) a right imaging sensor for digitizing and outputting (to the encoding device 106) a right image of a view for the human's right eye.

Also, the camera system 104 outputs additional information (collectively "capture information") to the encoding device 106. The capture information includes information (e.g., per stereoscopic image, or per scene of multiple stereoscopic images) about the camera system 104, such as a type of the camera system 104 and its then-current: (a) convergence plane, which is a plane where viewing axes of the left and right imaging sensors intersect; (b) interocular distance, which is a horizontal spacing between the left and right imaging sensors; (c) viewing angle and distance away from the object 102; (d) focus settings; and/or (e) exposure settings. From the camera system 104, the encoding device 106 receives such images and the capture information.

As discussed hereinbelow in connection with FIGS. 2-4, per stereoscopic image, the encoding device 106 computes: (a) a respective maximum positive disparity between the left and right images; and (b) a respective minimum negative disparity between the left and right images. In the illustrative embodiments, the encoding device 106 encodes at least the following into a binary logic bit stream: (a) such images; (b) the capture information; (c) the maximum positive disparity (per stereoscopic image); and (d) the minimum negative disparity (per stereoscopic image). Also, the encoding device 106 outputs the bit stream to a storage device 108, which receives and stores the bit stream. Optionally, in response to the capture information and the stereoscopic image's maximum positive disparity and minimum negative disparity, the encoding device 106 automatically converts such image by selectively adjusting its convergence plane to comply with limits on such disparities, before the encoding device 106 encodes such converted image into the bit stream.

A decoding device 110 reads the bit stream from the storage device 108. In response to the bit stream, the decoding device 110 decodes the bit stream into the following (collectively "decoded information"): (a) such images; (b) the capture information; (c) the maximum positive disparity (per stereoscopic image); and (d) the minimum negative disparity (per stereoscopic image). Also, the decoding device 110 outputs such decoded information to a conversion device 112.

The conversion device 112: (a) receives the decoded information from the decoding device 110; and (b) receives additional information (collectively "conversion information") from a display device 114. The conversion information includes: (a) information about the display device 114, such as a type, size, resolution and pixel density of a screen of the display device 114; and/or (b) information about a human user 116 (e.g., as specified by the user 116 via a touchscreen of the display device 114), such as preferences of the user 116 and its then-current viewing angle and distance away from the display device 114. In response to the decoded information and the conversion information, the conversion device 112: (a) as discussed hereinbelow in connection with FIGS. 2-10, automatically converts such images (e.g., by selectively adjusting their respective convergence planes); and (b) writes such converted images for storage into the storage device 108.

Also, the conversion device 112 outputs such converted images to the display device 114. Such outputting is: (a) substantially concurrent with such conversion by the conversion device 112 in real-time; and/or (b) after the conversion device 112 subsequently reads such converted images from the storage device 108 (e.g., in response to a command that the user 116 specifies via a touchscreen of the display device 114). The display device 114: (a) receives such converted images from the conversion device 112; and (b) in response thereto, displays such converted images (e.g., stereoscopic images of the object 102 and its surrounding foreground and background), which are viewable by the user 116.

The display device 114 is a stereoscopic display whose optical components enable viewing with 3D effect. In one example, the display device 114 displays such converted images (e.g., anaglyph images) with 3D effect for viewing by the user 116 through special glasses that: (a) filter the left image against being seen by a right eye of the user 116; and (b) filter the right image against being seen by a left eye of the user 116. In another example, the display device 114 is a stereoscopic 3D liquid crystal display device or a stereoscopic 3D organic electroluminescent display device, which displays such converted images with 3D effect for viewing by the user 116 without relying on special glasses.

The encoding device 106 performs its operations in response to instructions of a computer-readable program that is stored on a computer-readable medium 118 (e.g., hard disk drive, flash memory card, or other nonvolatile storage device). Similarly, the decoding device 110 and the conversion device 112 perform their operations in response to instructions of a computer-readable program that is stored on a computer-readable medium 120. Also, the computer-readable medium 120 stores a database of information for operations of the decoding device 110 and the conversion device 112.

In an alternative embodiment: (a) the encoding device 106 outputs the bit stream directly to the decoding device 110 via a communication channel (e.g., Ethernet, Internet, or wireless communication channel); and (b) accordingly, the decoding device 110 receives and processes the bit stream directly from the encoding device 106 in real-time. In such alternative embodiment, the storage device 108 either: (a) concurrently receives (in parallel with the decoding device 110) and stores the bit stream from the encoding device 106; or (b) is absent from the system 100. The system 100 is formed by electronic circuitry components for performing the system 100 operations, implemented in a suitable combination of software, firmware and hardware, such as one or more digital signal processors ("DSPs"), microprocessors, discrete logic devices, application specific integrated circuits ("ASICs"), and field-programmable gate arrays ("FPGAs").

Figure 2:
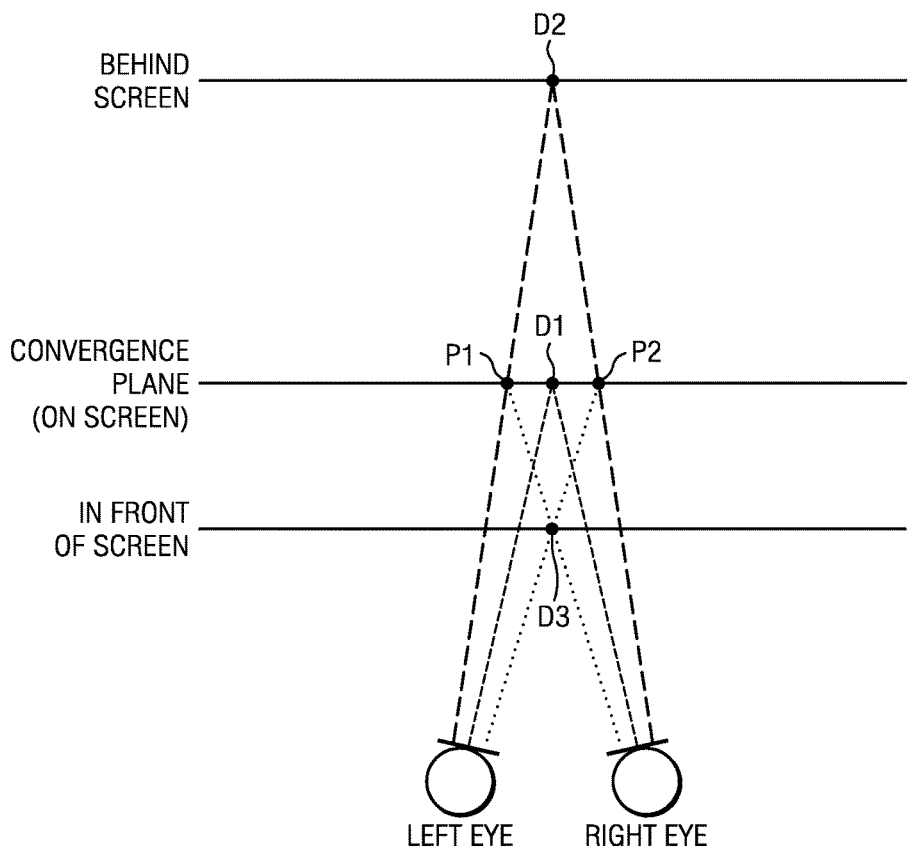
FIG. 2 is a diagram of viewing axes of a human's left and right eyes.

FIG. 2 is a diagram of viewing axes of left and right eyes of the user 116. In the example of FIG. 2, a stereoscopic image is displayed by the display device 114 on a screen (which is a convergence plane where viewing axes of the left and right eyes naturally converge to intersect). The user 116 experiences the 3D effect by viewing the image on the display device 114, so that various features (e.g., objects) appear on the screen (e.g., at a point D1), behind the screen (e.g., at a point D2), and/or in front of the screen (e.g., at a point D3).

Within the stereoscopic image, a feature's disparity is a horizontal shift between: (a) such feature's location within the left image; and (b) such feature's corresponding location within the right image. A limit of such disparity is dependent on the camera system 104. For example, if a feature (within the stereoscopic image) is horizontally centered on the point D1 within the left image, and likewise horizontally centered on the point D1 within the right image, then: (a) such feature's disparity=D1−D1=0; and (b) the user 116 will perceive the feature to appear at the point D1 with zero horizontal disparity on the screen, which is a natural convergence distance away from the left and right eyes.

By comparison, if the feature is horizontally centered on a point P1 within the left image, and horizontally centered on a point P2 within the right image, then: (a) such feature's disparity=P2−P1; and (b) the user 116 will perceive the feature to appear at the point D2 with positive disparity behind the screen, which is greater than the natural convergence distance away from the left and right eyes. Conversely, if the feature is horizontally centered on the point P2 within the left image, and horizontally centered on the point P1 within the right image, then: (a) such feature's disparity=P1−P2; and (b) the user 116 will perceive the feature to appear at the point D3 with negative disparity in front of the screen, which is less than the natural convergence distance away from the left and right eyes. The amount of the feature's disparity (e.g., horizontal shift of the feature from P1 within the left image to P2 within the right image) is measurable as a number of pixels, so that: (a) positive disparity is represented as a positive number; and (b) negative disparity is represented as a negative number.

Figure 3A:
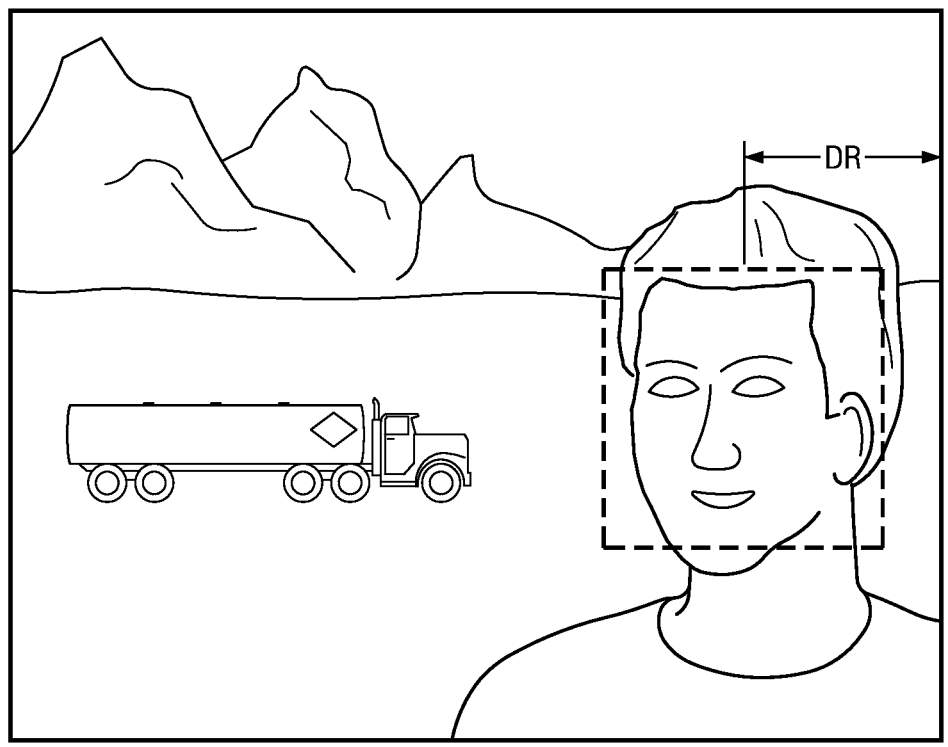
FIG. 3A is a diagram of a left image for viewing by the human's left eye on a display device of the system of FIG. 1.
Figure 3B:
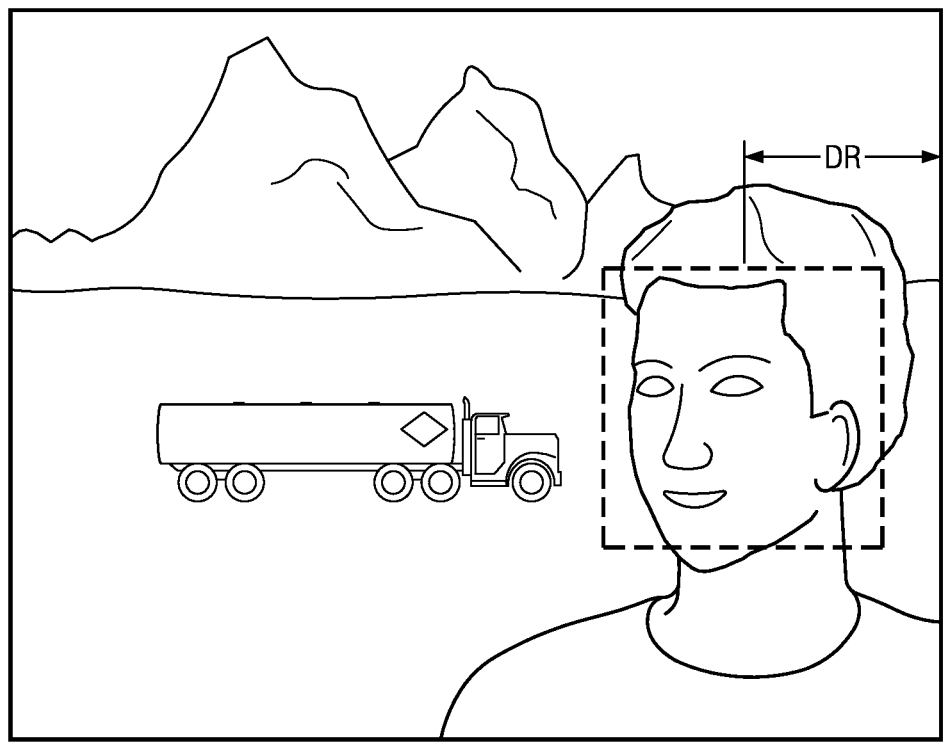
FIG. 3B is a diagram of a right image for viewing by the human's right eye on the display device.

FIG. 3A is a diagram of a left image for viewing by the left eye (of the user 116) on the display device 114. FIG. 3B is a diagram of a right image for viewing by the right eye (of the user 116) on the display device 114. Accordingly, the left image (FIG. 3A) and its associated right image (FIG. 3B) are a matched pair of left and right images, which correspond to one another, and which together form a stereoscopic image for display to the user 116. The matched pair of left and right images are contemporaneously (e.g., simultaneously) digitized and output (to the encoding device 106) by the left and right imaging sensors, respectively.

Portions of the image (e.g., features, such as objects, within the image) include a mountain range, a truck, and a person's face. As shown in FIG. 3A, the person's face is horizontally centered on a point that is located a distance DR (at a horizontal coordinate) away from the left image's right edge. Likewise, as shown in FIG. 3B, the person's face is horizontally centered on a point that is located the same distance DR (at the equal horizontal coordinate as its matched point in FIG. 3A) away from the right image's right edge. Because the person's face is horizontally centered on the same coordinate in both of the left and right images (of FIGS. 3A and 3B), the user 116 will perceive the person's face to appear on the screen, which is a natural convergence distance away from the left and right eyes.

By comparison, the mountain range and the truck within the left image of FIG. 3A are left of the mountain range and the truck within the right image of FIG. 3B. As discussed hereinabove in connection with FIG. 2, if a feature (e.g., at the point P1 in FIG. 2) within the left image is left of the same feature (e.g., at the point P2 in FIG. 2) within the right image, then the user 116 will perceive such feature to appear behind the screen. Accordingly, the user 116 will perceive the mountain range and the truck (of FIGS. 3A and 3B) to appear behind the screen.

Figure 4:
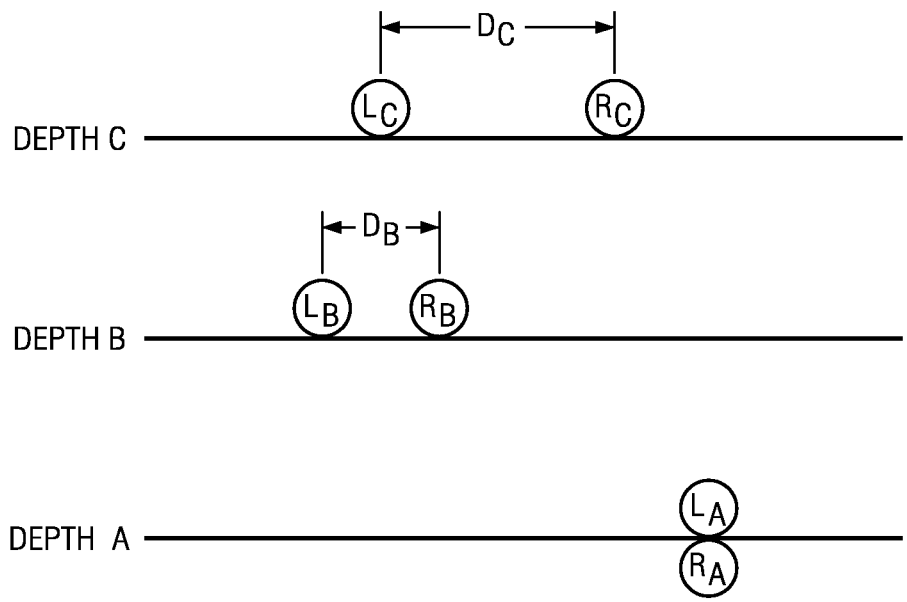
FIG. 4 is a diagram of features at various depths within the stereoscopic image of FIGS. 3A and 3B.

FIG. 4 is a diagram of features at various depths within the stereoscopic image of FIGS. 3A and 3B. Within the image, features include: (a) the person's face at a depth A, which is horizontally centered on a variable point $L_A$ within the left image (FIG. 3A) and horizontally centered on a variable point $R_A$ within the right image (FIG. 3B), where a disparity $D_A = R_A - L_A = 0$ (so the user 116 will perceive the person's face to appear on the screen); (b) the truck at a depth B, which is horizontally centered on a variable point $L_B$ within the left image (FIG. 3A) and horizontally centered on a variable point $R_B$ within the right image (FIG. 3B), where a disparity $D_B = R_B - L_B$ is shown in FIG. 4; and (c) the mountain range at a depth C, which is horizontally centered on a variable point $L_C$ within the left image (FIG. 3A) and horizontally centered on a variable point $R_C$ within the right image (FIG. 3B), where a disparity $D_C = R_C - L_C$ is shown in FIG. 4. Accordingly, in the example of FIGS. 3A, 3B and 4, the convergence plane is located at the depth A.

From among an image's features that are viewable (by the user 116) with acceptable sharpness, such image's depth of field is a difference between respective depths of: (a) a deepest one of those features ("deepest feature"); and (b) a shallowest one of those features ("shallowest feature"). If a stereoscopic image's depth of field is too large, then it can strain the user 116 in viewing such image with 3D effect. The deepest feature's disparity is such image's maximum positive disparity, and the shallowest feature's disparity is such image's minimum negative disparity. Accordingly, in the example of FIG. 4, if the mountain range (at the depth C) is such image's deepest feature, and if the person's face (at the depth A) is such image's shallowest feature, then: (a) such image's depth of field is a difference between the depth C and the depth A; and (b) the disparity $D_C$ is such image's maximum positive disparity.

In response to the decoded information (e.g., capture information) and the conversion information (e.g., type, size, resolution and pixel density of a screen of the display device 114, and preferences of the user 116 and its then-current viewing angle and distance away from the display device 114), the conversion device 112 automatically converts such image to increase: (a) quality of such image on the display device 114; and/or (b) comfort of the user 116 in viewing such image with 3D effect on the display device 114. For example, a length of $D_B$ and $D_C$ (as displayed on the display device 114) will increase or decrease in proportion to size of a screen of the display device 114.

In the illustrative embodiments, the conversion device 112 increases such quality and/or comfort by: (a) automatically determining whether such image's convergence plane complies with a limit on positive disparity and a limit on negative disparity; and (b) if necessary, adjusting such image's convergence plane to comply with such limits. The conversion device 112 receives such limits within the capture information and/or the conversion information. For example: (a) the limit on positive disparity is smaller than a horizontal spacing between the left and right eyes of the user 116; and (b) the limit on negative disparity controls a permissible extent to which the shallowest feature may appear (to the user 116) in front of the screen. After such conversion, the conversion device 112: (a) writes the converted image (and/or a measurement of such image's adjusted convergence plane) for storage into the storage device 108; and (b) outputs the converted image to the display device 114 for display to the user 116.

Optionally, in performing such conversion, the conversion device 112 adjusts for a difference between: (a) the interocular distance of the camera system 104, which the conversion device 112 receives within the capture information; and (b) a horizontal spacing between the left and right eyes of the user 116, which the conversion device 112 receives within the conversion information. As a further option, in performing such conversion, the conversion device 112 adjusts for a difference between: (a) viewing angle and distance of the camera system 104 away from the object 102, which the conversion device 112 receives within the capture information; and (b) viewing angle and distance of the user 116 away from the display device 114, which the conversion device 112 receives within the conversion information. As yet another option, with respect to the object 102 and other features that are focused within such image, the conversion device 112 performs such conversion (e.g., including adjustment of brightness and contrast within such image) in a manner that improves viewing by the user 116 of the object 102 and such other features with 3D effect on the display device 114, in response to: (a) focus settings and exposure settings of the camera system 104, which the conversion device 112 receives within the capture information; and (b) the conversion information.

As discussed hereinabove in connection with FIG. 1, per stereoscopic image, the encoding device 106 computes such image's maximum positive disparity and minimum negative disparity by automatically: (a) detecting one or more features within such image; (b) computing respective disparities (of such features) between the left and right images; (c) determining a highest one of those respective disparities (which is such image's maximum positive disparity); and (d) determining a lowest one of those respective disparities (which is such image's minimum negative disparity). Such disparities and the capture information are: (a) encoded into the bit stream by the encoding device 106; (b) decoded from the bit stream by the decoding device 110; and (c) received from the decoding device 110 by the conversion device 112. In that manner, the conversion device 112 performs its automatic conversion of such image with: (a) more efficiency, because the conversion device 112 is not required to compute such disparities; and (b) more efficacy, because the conversion device 112 is responsive to the capture information and the conversion information.

If such image's minimum negative disparity violates the limit on negative disparity, or if such image's maximum positive disparity violates the limit on positive disparity, then such violation can strain the user 116 in viewing such image with 3D effect. Accordingly, in response to the conversion device 112 determining that such image's minimum negative disparity violates the limit on negative disparity (e.g., according to type, size, resolution and pixel density of the screen of the display device 114, and preferences of the user 116 and its then-current viewing angle and distance away from the display device 114), the conversion device 112 automatically adjusts such image's convergence plane to comply with such limit. For such adjustment, the conversion device 112: (a) computes a difference between such image's minimum negative disparity and such limit; (b) shifts the left image in a left direction by one-half of such difference; and (c) shifts the right image in a right direction by one-half of such difference.

Similarly, in response to the conversion device 112 determining that such image's maximum positive disparity violates the limit on positive disparity (e.g., according to type, size, resolution and pixel density of the screen of the display device 114, and preferences of the user 116 and its then-current viewing angle and distance away from the display device 114), the conversion device 112 automatically adjusts such image's convergence plane to comply with such limit. For such adjustment, the conversion device 112: (a) computes a difference between such image's maximum positive disparity and such limit; (b) shifts the left image in a right direction by one-half of such difference; and (c) shifts the right image in a left direction by one-half of such difference. However, the conversion device 112 performs such adjustment only to an extent possible while ensuring that such image's convergence plane complies with the limit on negative disparity (e.g., ensuring that such image's minimum negative disparity complies with the limit on negative disparity).

Figure 5A:
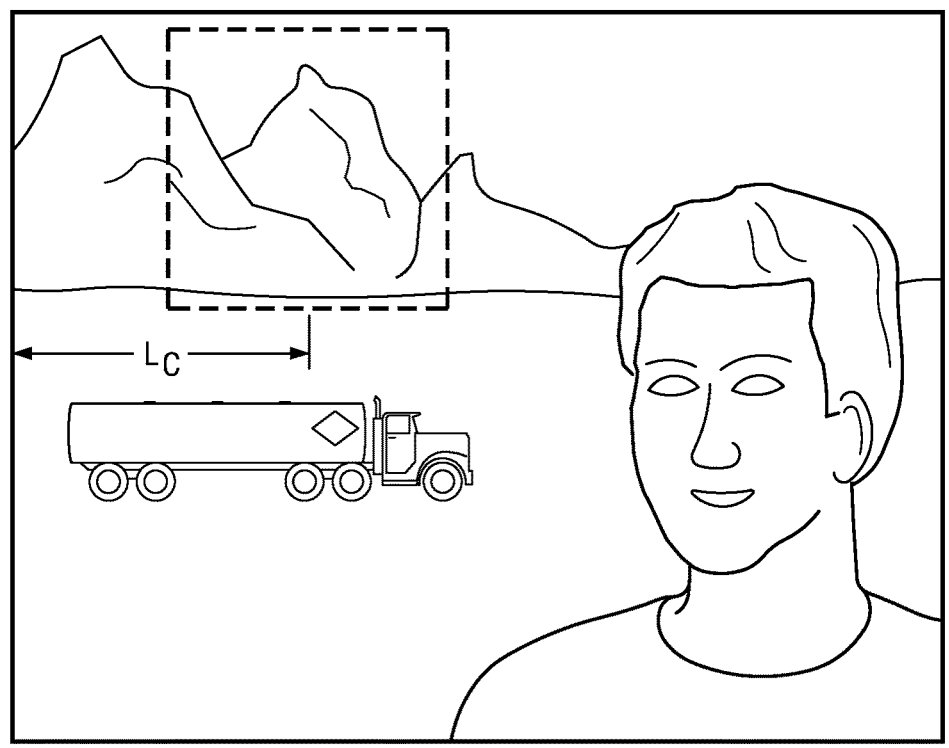
FIG. 5A is a diagram of the left image of FIG. 3A, in which a different portion of the left image is identified by a dashed enclosure.
Figure 5B:
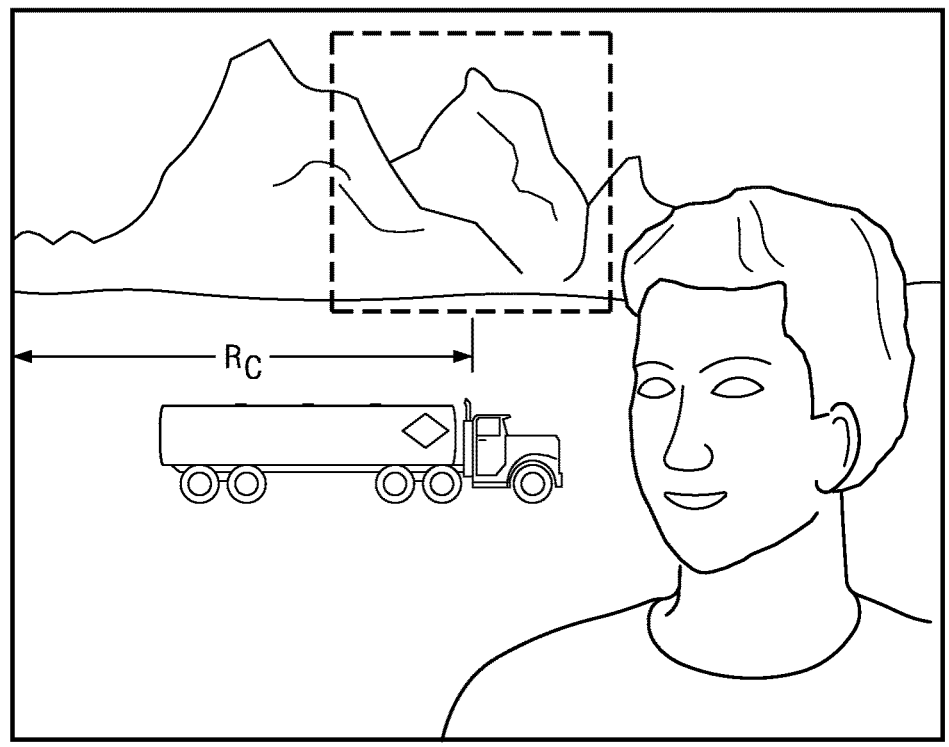
FIG. 5B is a diagram of the right image of FIG. 3B, in which a different portion of the right image is identified by a dashed enclosure.

FIG. 5A is a diagram of the left image of FIG. 3A, in which the mountain range is horizontally centered on a point (within dashed enclosure) that is located $L_C$ away from the left image's left edge. FIG. 5B is a diagram of the right image of FIG. 3B, in which the mountain range is horizontally centered on a point (within dashed enclosure) that is located $R_C$ away from the right image's left edge. In this example: (a) the mountain range is such image's deepest feature; (b) the mountain range's disparity $R_C-L_C=D_C$ is such image's maximum positive disparity; (c) $D_B$ is the limit on positive disparity; and (d) $D_C=2\times D_B$, so $D_C$ violates the limit on positive disparity by the amount $D_B$.

Figure 6A:
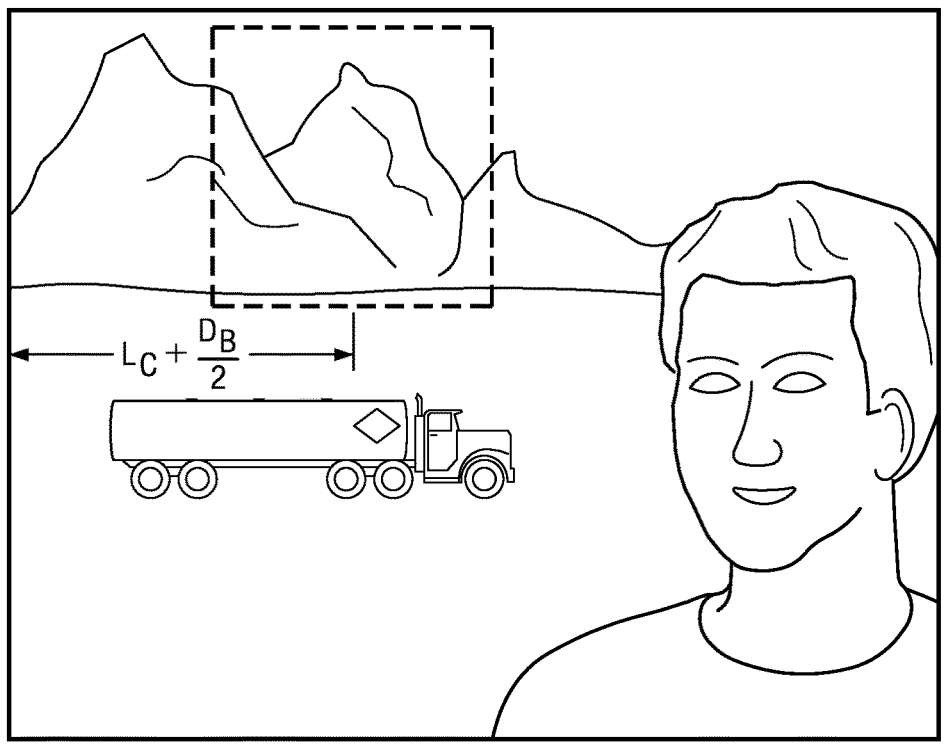
FIG. 6A is a diagram of a displayable version of the left image of FIG. 5A, after the conversion device has adjusted a convergence plane.
Figure 6B:
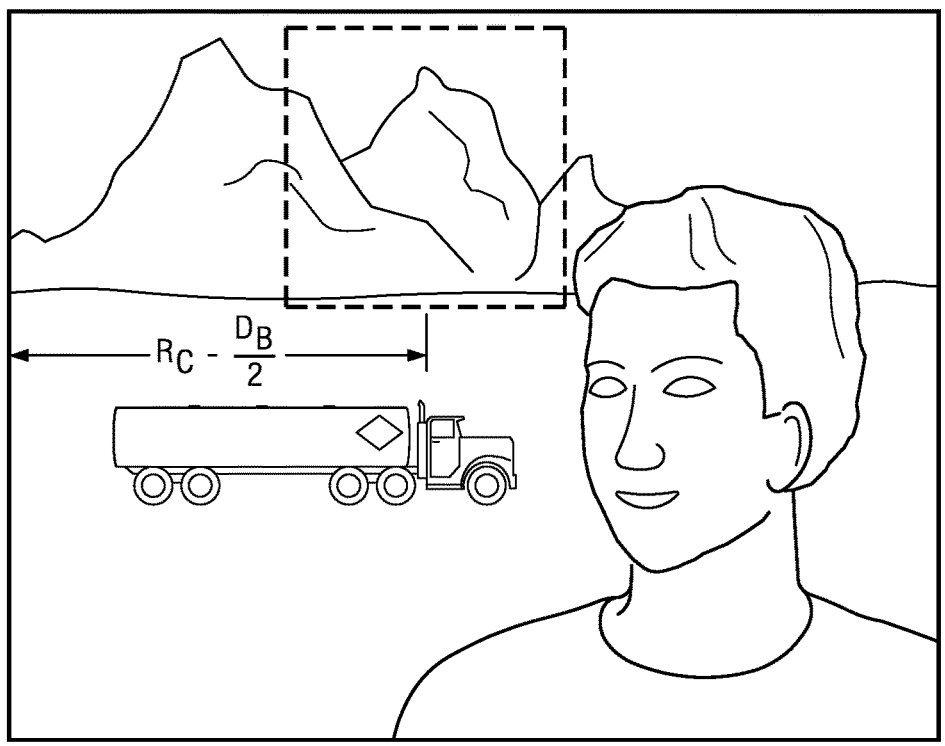
FIG. 6B is a diagram of a displayable version of the right image of FIG. 5B, after the conversion device has adjusted the convergence plane.

FIG. 6A is a diagram of a displayable version of the left image of FIG. 5A, after the conversion device 112 has adjusted the convergence plane to comply with the limits on positive and negative disparity. FIG. 6B is a diagram of a displayable version of the right image of FIG. 5B, after the conversion device 112 has adjusted the convergence plane to comply with the limits on positive and negative disparity. In this example, the conversion device 112 has automatically: (a) computed a difference between such image's maximum positive disparity ($D_C$) and the limit on positive disparity ($D_B$), so that such difference=$D_C-D_B=D_B$; (b) shifted the left image in a right direction by one-half of such difference, so that the mountain range in FIG. 6A is horizontally centered on a point (within dashed enclosure) that is located $L_C+D_B/2$ away from the left image's left edge; and (c) shifted the right image in a left direction by one-half of such difference, so that the mountain range in FIG. 6B is horizontally centered on a point (within dashed enclosure) that is located $R_C-D_B/2$ away from the right image's left edge.

Figure 7:
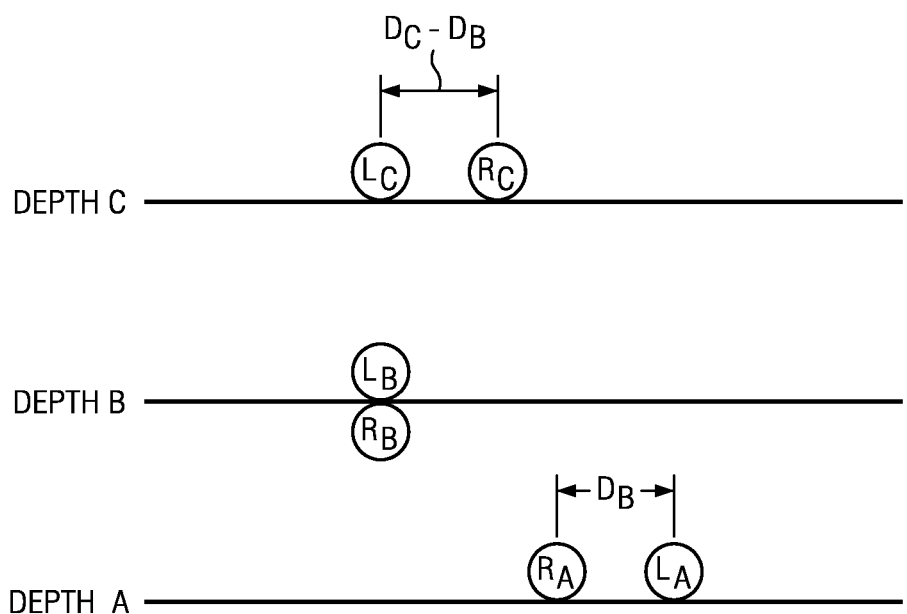
FIG. 7 is a diagram of features at various depths within the stereoscopic image of FIGS. 6A and 6B.

FIG. 7 is a diagram of features at various depths within the stereoscopic image of FIGS. 6A and 6B. As shown in the example of FIGS. 6A, 6B and 7, a disparity of the mountain range between $R_C$ and $L_C$ (at the depth C) has been reduced to $R_C-L_C=D_C-D_B=D_B$ (instead of $D_C$), so that: (a) such reduced disparity complies with the limit on positive disparity; and (b) the user 116 will continue perceiving the mountain range to appear behind the screen. By comparison, in this same example, a disparity of the person's face between $R_A$ and $L_A$ (at the depth A) has been increased to $R_A-L_A=-D_B$ (instead of 0), so that: (a) such increased disparity still complies with the limit on negative disparity; and (b) the user 116 will perceive the person's face to appear in front of the screen. Accordingly, in this same example, a disparity of the truck between $R_B$ and $L_B$ (at the depth B) has been reduced to $R_B-L_B=0$ (instead of $D_B$), so that: (a) the convergence plane is located at the depth B; (b) the truck is horizontally centered on the same point in FIGS. 6A and 6B; and (c) the user 116 will perceive the truck to appear on the screen.

Figure 8A:
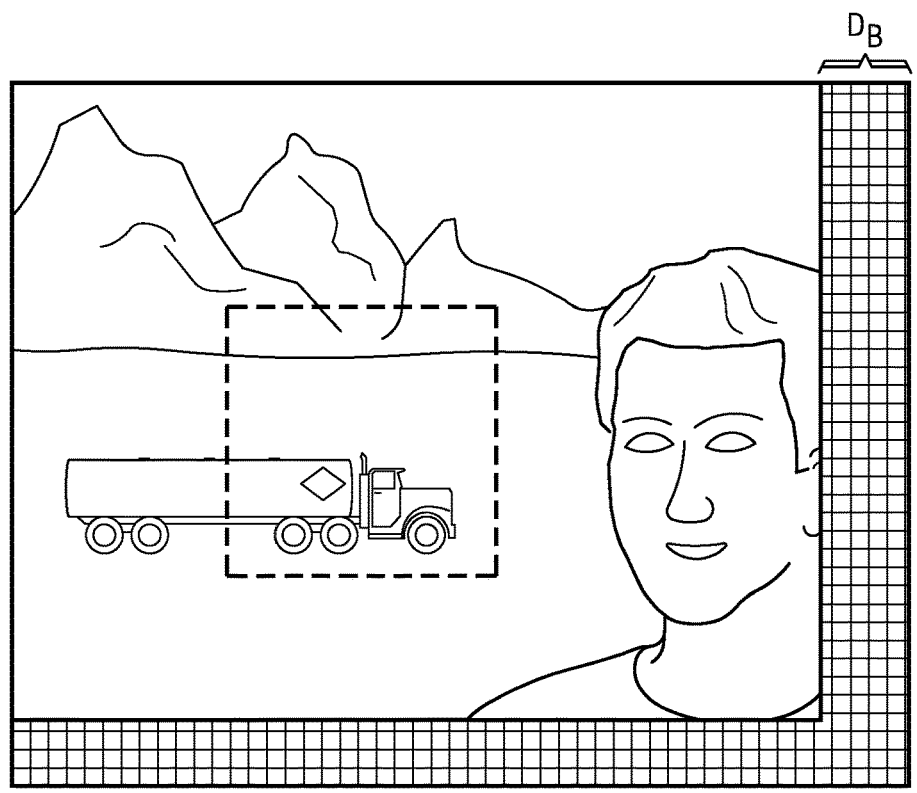
FIG. 8A is a diagram of a cropped version of the left image of FIG. 5A, after the conversion device has adjusted the convergence plane.
Figure 8B:
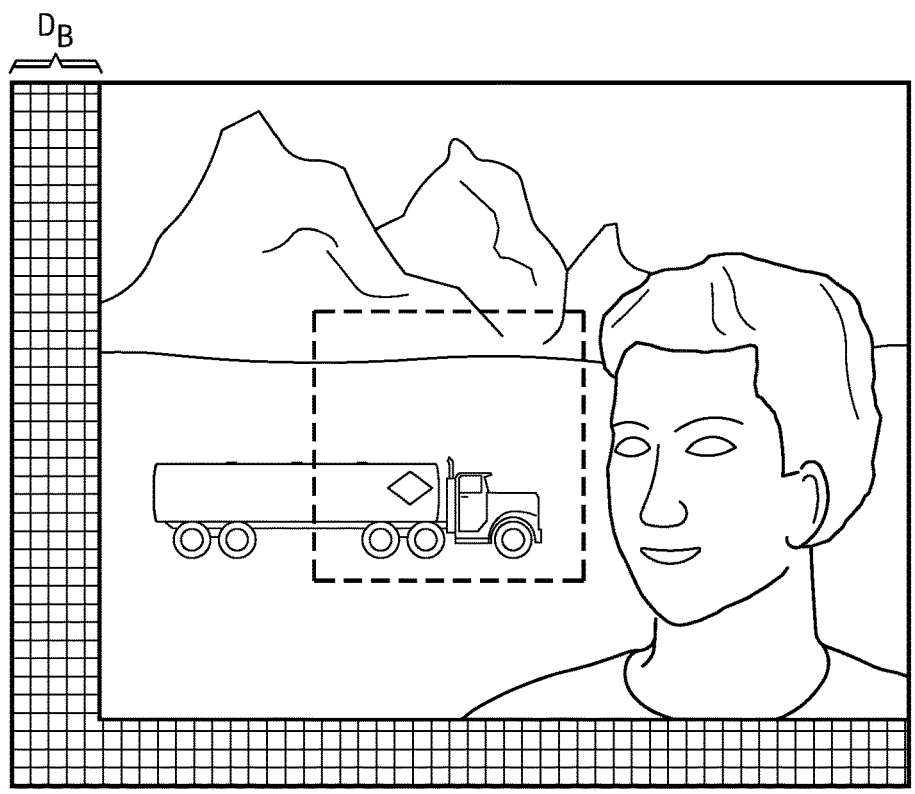
FIG. 8B is a diagram of a cropped version of the right image of FIG. 5B, after the conversion device has adjusted the convergence plane.

FIG. 8A is a diagram of a cropped version of the left image of FIG. 5A, after the conversion device 112 has adjusted the convergence plane to comply with the limits on positive and negative disparity. FIG. 8B is a diagram of a cropped version of the right image of FIG. 5B, after the conversion device 112 has adjusted the convergence plane to comply with the limits on positive and negative disparity. For example, in horizontally shifting the left image of FIG. 5A in a right direction, additional left image information (e.g., beyond a left edge of the left image of FIG. 5A) might be unavailable to the conversion device 112. Similarly, in horizontally shifting the right image of FIG. 5B in a left direction, additional right image information (e.g., beyond a right edge of the right image of FIG. 5B) might be unavailable to the conversion device 112.

In response to such unavailability, the conversion device 112 automatically adjusts such image's convergence plane to comply with the limit on positive disparity by: (a) cropping the left edge of the right image for achieving such compliance, to an extent of the difference between such image's maximum positive disparity and the limit on positive disparity; (b) to the same extent, cropping the right edge of the left image for equaling size of the left and right images; (c) cropping the bottom (and/or top) edges of the right and left images to preserve the stereoscopic image's aspect ratio; and (d) optionally, magnifying the cropped versions of the left and right images to restore their original dimensions that existed before such cropping. However, the conversion device 112 performs such adjustment only to an extent possible while ensuring that such image's convergence plane complies with the limit on negative disparity (e.g., ensuring that such image's minimum negative disparity complies with the limit on negative disparity).

Accordingly, in the example of FIGS. 8A and 8B, the conversion device 112 has automatically adjusted such image's convergence plane to comply with the limit on positive disparity by: (a) cropping the left edge of the right image for achieving such compliance, to an extent of the difference between such image's maximum positive disparity ($D_C$) and the limit on positive disparity ($D_B$), so that such difference=$D_C-D_B=D_B$, as shown in FIG. 8B; (b) to the same extent, cropping the right edge of the left image for equaling size of the left and right images, as shown in FIG. 8A; and (c) cropping the bottom edges of the right and left images to preserve the stereoscopic image's aspect ratio, as shown in FIGS. 8A and 8B.

For example, as shown in FIG. 8A, the dashed enclosure (around the truck) is horizontally centered on a point that is located (at a horizontal coordinate): (a) a first distance away from the left edge of the left image; and (b) a second distance away from the visible (non-cropped) right edge of the left image. Similarly, as shown in FIG. 8B, the dashed enclosure (around the truck) is horizontally centered on the same point that is located (at the same horizontal coordinate): (a) the first distance away from the visible (non-cropped) left edge of the right image; and (b) the second distance away from the right edge of the right image. Accordingly, the user 116 will perceive such point (at such horizontal coordinate) to appear on the screen, which is a natural convergence distance away from eyes of the user 116.

Similarly, in response to such unavailability, the conversion device 112 automatically adjusts such image's convergence plane to comply with the limit on negative disparity by: (a) cropping the left edge of the left image for achieving such compliance, to an extent of the difference between such image's minimum negative disparity and the limit on negative disparity; (b) to the same extent, cropping the right edge of the right image for equaling size of the left and right images; (c) cropping the bottom (and/or top) edges of the right and left images to preserve the stereoscopic image's aspect ratio; and (d) optionally, magnifying the cropped versions of the left and right images to restore their original dimensions that existed before such cropping.

Figure 9:
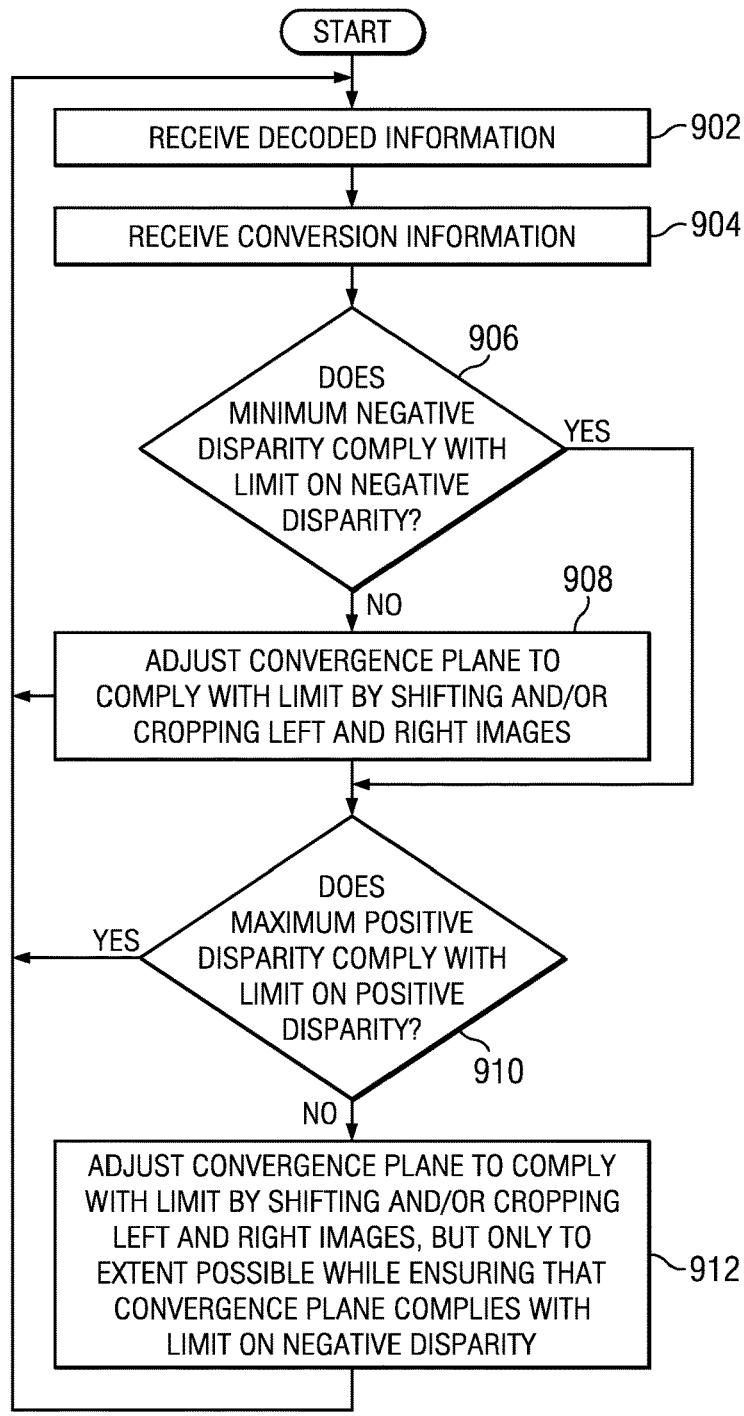
FIG. 9 is a flowchart of operation of the conversion device.

FIG. 9 is a flowchart of operation of the conversion device 112. The operation begins at a step 902, at which the conversion device 112 receives the decoded information from the decoding device 110. At a next step 904, the conversion device 112 receives the conversion information from the display device 114. At a next step 906, in response to the decoded information and the conversion information, the conversion device 112 automatically determines whether the stereoscopic image's minimum negative disparity complies with the limit on negative disparity (e.g., according to type, size, resolution and pixel density of the screen of the display device 114, and preferences of the user 116 and its then-current viewing angle and distance away from the display device 114).

In response to the conversion device 112 determining that the stereoscopic image's minimum negative disparity violates the limit on negative disparity, the operation continues from the step 906 to a step 908. At the step 908, the conversion device 112 automatically adjusts such image's convergence plane to comply with such limit by shifting (as discussed hereinabove in connection with FIGS. 6A and 6B) and/or cropping (as discussed hereinabove in connection with FIGS. 8A and 8B) the left and right images. After the step 908: (a) the conversion device 112 writes the converted image (and/or a measurement of such image's adjusted convergence plane) for storage into the storage device 108; (b) the conversion device 112 outputs the converted image to the display device 114 for display to the user 116; and (c) the operation returns to the step 902 for processing of a next image.

Conversely, in response to the conversion device 112 determining at the step 906 that the stereoscopic image's minimum negative disparity complies with the limit on negative disparity, the operation continues from the step 906 to a step 910. At the step 910, in response to the decoded information and the conversion information, the conversion device 112 automatically determines whether the stereoscopic image's maximum positive disparity complies with the limit on positive disparity (e.g., according to type, size, resolution and pixel density of the screen of the display device 114, and preferences of the user 116 and its then-current viewing angle and distance away from the display device 114). In response to the conversion device 112 determining that the stereoscopic image's maximum positive disparity violates the limit on positive disparity, the operation continues from the step 910 to a step 912.

At the step 912, the conversion device 112 automatically adjusts such image's convergence plane to comply with such limit by shifting (as discussed hereinabove in connection with FIGS. 6A and 6B) and/or cropping (as discussed hereinabove in connection with FIGS. 8A and 8B) the left and right images. However, the conversion device 112 reduces such adjustment if necessary to ensure that such image's minimum negative disparity complies with the limit on negative disparity. After the step 912: (a) the conversion device 112 writes the converted image (and/or a measurement of such image's adjusted convergence plane) for storage into the storage device 108; (b) the conversion device 112 outputs the converted image to the display device 114 for display to the user 116; and (c) the operation returns to the step 902 for processing of a next image. Conversely, in response to the conversion device 112 determining at the step 910 that the stereoscopic image's maximum positive disparity complies with the limit on positive disparity, the operation returns from the step 910 to the step 902.

Figure 10:
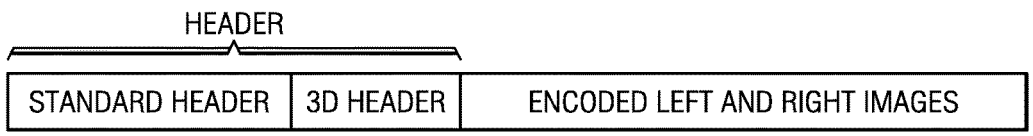
FIG. 10 is a diagram of an example packet of an encoded bit stream.

FIG. 10 is a diagram of an example packet of an encoded bit stream. As shown in FIG. 10, the example packet includes: (a) a header; and (b) an encoded left image and an encoded right image, which together form the stereoscopic image. The header includes: (a) a standard header; and (b) a 3D header, which includes the capture information. In the illustrative embodiments, the capture information is encoded within a modified (e.g., extended) version of: (a) a header for the JPEG 2000 3D ("JP3D") standard of the Joint Photographic Experts Group ("JPEG"); (b) supplemental enhancement information ("SEI") for the advanced video coding ("AVC") H.264 standard of the International Telecommunication Union's Telecommunication Standardization Sector ("ITU-T"); and/or (c) a parameter set for the AVC H.264 standard's multiview video coding ("MVC") extension.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method comprising:
    receiving, at a conversion device, capture information from a decoding device, wherein the capture information comprises a stereoscopic image of first and second views, maximum positive disparity of a first object in the first and second views, and minimum negative disparity of a second object in the first and second views;
    receiving, at the conversion device, conversion information from a display device;
    determining, at the conversion device, whether a convergence plane of the stereoscopic image complies with the maximum positive disparity and minimum negative disparity;
    adjusting, at the conversion device, the first view of the stereoscopic image by a first amount at a first edge based on:
        the maximum positive disparity of the first object;
        the minimum negative disparity of the second object; and
        the determination of whether the convergence plane of the stereoscopic image complies with the maximum positive disparity and minimum negative disparity;
    adjusting, at the conversion device, the second view of the stereoscopic image by a second amount at a second edge, wherein the second amount is equal to the first amount and the second edge is opposite the first edge; and
    outputting, by the conversion device, the adjusted first view and the adjusted second view of the stereoscopic image to the display device.

2. The method of claim 1, wherein the stereoscopic image is from a stereoscopic camera system, and wherein capture information includes at least one of the following: a type of the stereoscopic came camera system; a plane where viewing axes of the first and second imaging sensors intersect; a viewing angle of the stereoscopic camera system away from an object; a distance of the stereoscopic camera system away from the object; a focus setting of the stereoscopic camera system; and an exposure setting of the stereoscopic camera system.

3. The method of claim 1, wherein the first and second views are left and right views, respectively.

4. The method of claim 1, wherein the decoding the maximum positive disparity and the minimum negative disparity comprises decoding the maximum positive disparity and the minimum negative disparity from a header of the capture information.

5. The method of claim 1, wherein the conversion information about the display device includes at least one of the following: a type of the display device; a size of the display device; a resolution of the display device; and a pixel density of the display device.

6. The method of claim 1, further comprising:
    receiving, by the conversion device, user information about a user of the display device from the display device,
    wherein the information about the user includes at least one of the following: a preference of the user; a viewing angle of the user away from the display device; and a distance of the user away from the display device.

7. The method of claim 6, wherein adjusting the stereoscopic image is further based on the received user information.

8. The method of claim 1, wherein adjusting the stereoscopic image comprises adjusting the convergence plane by shifting at least one of the first and second views in relation to one another.

9. The method of claim 1, wherein adjusting the stereoscopic image comprises adjusting the convergence plane by cropping at least one of the first and second views.

10. A conversion device comprising: one or more processors; and a memory coupled to the processors comprising instructions executable by the processors, the processors being operable when executing the instructions to:
    receive, at the conversion device, capture information from a decoding device, wherein the capture information comprises a stereoscopic image of first and second views, maximum positive disparity of a first object in the first and second views, and minimum negative disparity of a second object in the first and second views;

receive, at the conversion device, conversion information from a display device;

determine, at the conversion device, whether a convergence plane of the stereoscopic image complies with the maximum positive disparity and minimum negative disparity;

adjust, at the conversion device, the first view of the stereoscopic image by a first amount at a first edge based on:
 the maximum positive disparity of the first object;
 the minimum negative disparity of the second object; and
 the determination of whether the convergence plane of the stereoscopic image complies with the maximum positive disparity and minimum negative disparity;

adjust, at the conversion device, the second view of the stereoscopic image by a second amount at a second edge, wherein the second amount is equal to the first amount and the second edge is opposite the first edge; and output, by the conversion device, the adjusted first view and the adjusted second view of the stereoscopic image to the display device.

11. The conversion device of claim 10,
wherein the stereoscopic image is from a stereoscopic camera system, and wherein the capture information includes at least one of the following: a type of the stereoscopic camera system; an interocular distance between first and second imaging sensors of the stereoscopic camera system; a plane where viewing axes of the first and second imaging sensors intersect; a viewing angle of the stereoscopic camera system away from an object; a distance of the stereoscopic camera system away from the object; a focus setting of the stereoscopic camera system; and an exposure setting of the stereoscopic camera system.

12. The conversion device of claim 10, wherein the first and second views are left and right views, respectively.

13. The conversion device of claim 10, wherein the decoding the maximum positive disparity and the minimum negative disparity comprise: decoding the maximum positive disparity and the minimum negative disparity from a header of the capture information.

14. The conversion device of claim 10,
wherein the conversion information comprises at least one of the following: a type of the display device; a size of the display device; a resolution of the display device; and a pixel density of the display device.

15. The conversion device of claim 10, wherein the processors are further operable when executing the instructions to receive, at the conversion device, user information about a user from the display device;
 wherein the user information comprises at least one of the following: a preference of the user; a viewing angle of the user away from the display device; and a distance of the user away from the display device.

16. The conversion device of claim 15, wherein adjusting the stereoscopic image is further based on the received user information.

17. The conversion device of claim 10, wherein adjusting the stereoscopic image comprises adjusting the convergence plane by shifting at least one of the first and second views in relation to one another.

18. The conversion device of claim 10, wherein adjusting the stereoscopic image comprises adjusting the convergence plane by cropping at least one of the first and second views.

19. One or more computer-readable non-transitory storage media embodying software that is operable when executed to:
 receive, at a conversion device, capture information from a decoding device, wherein the capture information comprises a stereoscopic image of first and second views, maximum positive disparity of a first object in the first and second views, and minimum negative disparity of a second object in the first and second views;
 receive, at the conversion device, conversion information from a display device;
 determine, at the conversion device, whether a convergence plane of the stereoscopic image complies with the maximum positive disparity and minimum negative disparity;
 adjust, at the conversion device, the first view of the stereoscopic image by a first amount at a first edge based on:
  the maximum positive disparity of the first object;
  the minimum negative disparity of the second object; and
  the determination of whether the convergence plane of the stereoscopic image complies with the maximum positive disparity and minimum negative disparity;
 adjust, at the conversion device, the second view of the stereoscopic image by a second amount at a second edge, wherein the second amount is equal to the first amount and the second edge is opposite the first edge; and
 output, by the conversion device, the stereoscopic image to the display device.

20. The media of claim 19,
wherein the stereoscopic image is from a stereoscopic camera system, and wherein the capture information includes at least one of the following: a type of the stereoscopic camera system; an interocular distance between first and second imaging sensors of the stereoscopic camera system; a plane where viewing axes of the first and second imaging sensors intersect; a viewing angle of the stereoscopic camera system away from an object; a distance of the stereoscopic camera system away from the object; a focus setting of the stereoscopic camera system; and an exposure setting of the stereoscopic camera system.

21. The media of claim 19, wherein the first and second views are left and right views, respectively.

22. The media of claim 19, wherein the decoding the maximum positive disparity and the minimum negative disparity comprises decoding the maximum positive disparity and the minimum negative disparity from a header of the capture information.

23. The media of claim 19,
wherein the conversion information comprises at least one of the following: a type of the display device; a size of the display device; a resolution of the display device; and a pixel density of the display device.

24. The media of claim 19, wherein the software is further operable when executed to receive, at the conversion device from the display device, user information about a user of the display device;
 wherein the user information comprises at least one of the following: a preference of the user; a viewing angle of the user away from the display device; and a distance of the user away from the display device.

25. The media of claim 24, wherein adjusting the stereoscopic image comprises adjusting the convergence plane in response to the information about the user.

26. The media of claim 19, wherein adjusting the stereoscopic image comprises adjusting the convergence plane by shifting at least one of the first and second views in relation to one another.

27. The media of claim 19, wherein adjusting the stereoscopic image comprises adjusting the convergence plane by cropping at least one of the first and second views.

\* \* \* \* \*